Feb. 3, 1970                J. SILVERMAN                3,493,857
          ANALYZER USING AN OPERATIONAL AMPLIFIER AND
             RANGE SELECTION MEANS TO VARY THE
                     SENSITIVITY THEREOF
                    Filed May 10, 1968
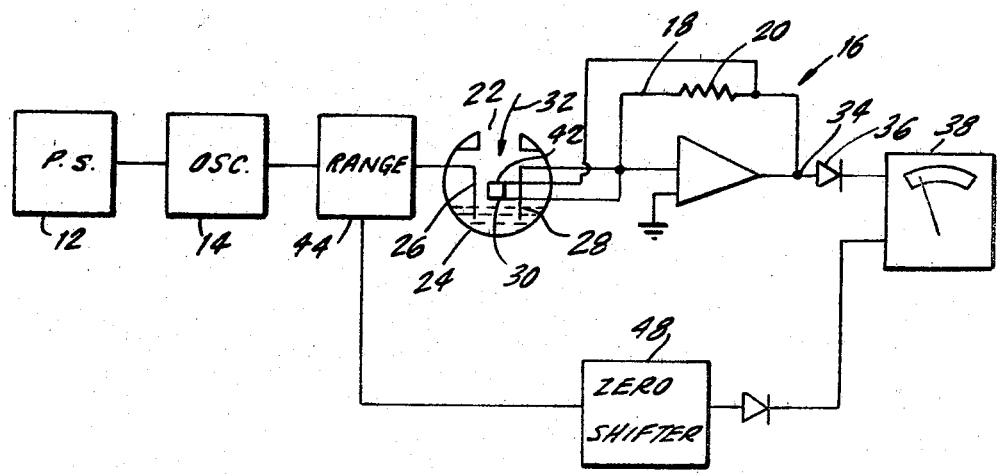
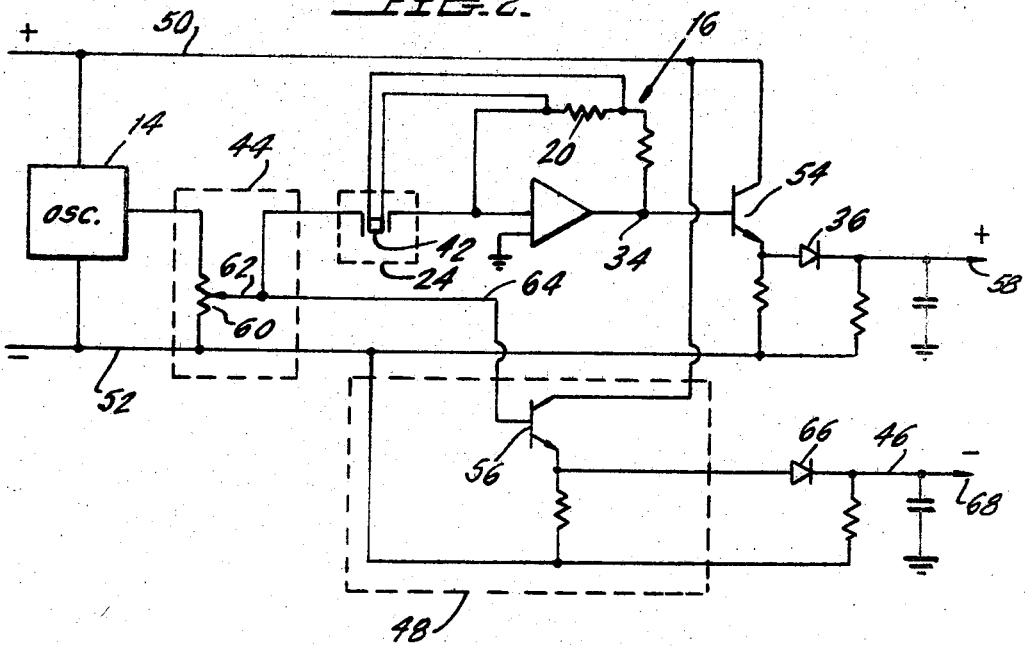
INVENTOR
JOHN SILVERMAN
BY
OSTROLENK, FABER, GERB & SOFFEN
ATTORNEYS

United States Patent Office 3,493,857
Patented Feb. 3, 1970

3,493,857
ANALYZER USING AN OPERATIONAL AMPLIFIER AND RANGE SELECTION MEANS TO VARY THE SENSITIVITY THEREOF
John Silverman, Hempstead, N.Y., assignor to Scientific Industries, Inc., Hempstead, N.Y., a corporation of Delaware
Continuation-in-part of application Ser. No. 655,452, July 24, 1967. This application May 10, 1968, Ser. No. 728,306
Int. Cl. G01n 27/00
U.S. Cl. 324—71    6 Claims

ABSTRACT OF THE DISCLOSURE

A sampling and analyzing device for determining the concentration of a substance, including a sensing element the impedance of which varies in proportion to the concentration of the substance being detected. The variable impedance is utilized as one of the impedances of an operational feedback amplifier, the variable output of which, being proportional to the variations in the aforementioned impedance, will provide an indication of the concentration of the detected susbstance.

---

This application is a continuation-in-part of application Ser. No. 655,452 filed July 24, 1967, now abandoned.

This invention relates to sampling and analyzing instruments, and more particularly to an analyzer preferably utilized to detect the concentration of $SO_2$ and other impurities in the air.

In recent years, the problem of air pollution has become increasingly important and occupies the time of many people who previously had little or no concern for the dangers inherent in breathing contaminated air. This relatively sudden interest in this very real and very important problem has given rise to the need for an inexpensive, reliable, simple and easy to use sampling device which can provide a direct indication of the concentration of impurities such as $SO_2$ in the air.

Various instruments have been available in the prior art for indicating the concentration of impurities in the air, but have been relatively complex, consequently expensive, and perhaps more importantly, difficult to use by virtually anybody who has not had a great deal of experience in this field. For example, a typical prior art sampling and analyzing device might include some type of sensing element or probe, the resistance of which varies in accordance with the concentration of the contaminant exposed to the probe. Generally, such variable resistance probe constitutes one arm of a bridge circuit which must be continuously balanced by the user in order to indirectly provide an indication of the concentration of the contaminant or pullutant in the air. This system, in addition to requiring relatively sophisticated personnel, requires constant readjustment to balance the bridge circuit each time there is a variation in the concentration of the contaminant being detected.

In contradistinction, the instant invention provides a sampling and analyzing instrument which is simple, inexpensive, and easy to use. Thus the instant invention, like the prior art, includes a sensing element the impedance of which varies in proportion to the concentration of the impurity to which it is exposed. However, rather than utilizing such variable impedance as one arm of a bridge circuit which requires constant balancing, the instant invention utilizes such variable impedance of the sensing element as one of the impedances (either the feedback impedance or the input impedance) of an operational feedback amplifier. Since in an operational amplifier the output thereof is proportional to the ratio of the feedback impedance over the input impedance, it becomes evident that, in the instant invention, the output of the amplifier will present a variable signal directly proportional to the variations in impedance of the sensing element whereby a direct and continuous indication of concentration of the contaminant exposed to the sensing element will be provided. By providing that the output of the amplifier function as the input to an appropriately calibrated meter, it is thereby possible to read (and record, if desired) concentration of impurity directly, without the necessity of continuously balancing as required in prior art.

As a particularly advantageous feature of the instant invention, temperature compensation means are provided to automatically correct the instrument for variations in ambient temperature conditions. In a preferred embodiment such temperature compensation means comprises at least one thermistor, that is, a temperature variable resistance, which, by appropriate electrical connection, varies the output of the aforenoted operational amplifier.

As another particularly advantageous feature of the instant invention, a range selection system is provided which has the effect of either increasing or decreasing the sensitivity of the instrument whereby the detection of a greater range of impurity concentrations with the basic apparatus is made possible. Preferably such range selection means comprises a variable potentiometer arrangement whereby the magnitude of the input signal to the operational amplifier can be varied. Since from the aforementioned equation the output of the operational amplifier is proportional to the input signal times the ratio of feedback impedance over input impedance, by varying the input signal it is possible to obtain a larger output signal for the same values of feedback and input impedance, or, alternatively, it is possible to obtain a scaled-up or scaled-down output signal when faced with lower or higher concentrations, respectively, of the impurity being detected.

As a further feature of the instant invention, it will be appreciated that whenever the range selection system is utilized to increase or decrease the sensitivity of the instrument, it is necessary that the zero point from which the output signal of the operational amplifier is measured be appropriately changed. For example, assume that a meter having a scale calibrated directly in concentration of the pollutant is responsive to the output of the operational amplifier with a given concentration of pollutant (and therefore a given ratio of feedback impedance to input impedance). An increase in the input signal to the operational amplifier will produce an increased output signal will indicate an incorrect concentration of the impurity unless means were provided to correspondingly upshift to zero point of the meter. Thus the instant invention provides such a zero shifting means which is automatically responsive to operation of the range selection means to correspondingly vary the zero point from which the output signal of the operational amplifier is compared, regardless of the particular range of sensitivity of the instrument being employed.

Accordingly, it is an object of the instant invention to provide a sampling and analyzing apparatus which is simple, inexpensive, and easy to use.

Another object of the instant invention is to provide such a sampling and analyzing apparatus which is capable of continuously and accurately providing a direct indication of concentration of impurities.

Still another object of the instant invention is to provide such a sampling and analyzing instrument which is especially useful for continuously and directly providing an indication of the concentration of pollutants and contaminants, such as $SO_2$, in air.

Another object of the instant invention is to provide such a sampling and analyzing instrument which makes use of an operational amplifier to completely eliminate the need for continuously balancing a bridge network in order to obtain an indication of the concentration of air pollution.

Still another object of the instant invention is to provide such a sampling and analyzing instrument which includes temperature compensation means to compensate for variations in ambient temperature conditions.

Another object of the instant invention is to provide such a sampling an analyzing instrument which includes range selection means for increasing the sensitivity of an instrument constructed in accordance with teachings of this invention.

Yet another object of the instant invention is to provide such a sampling and analyzing instrument which includes zero shifting means responsive to the operation of the aforementioned range selection means for continuously updating the zero point from which the output of the instrument is measured.

Other objects and a fuller understanding of the instant invention may be had by referring to the following description and drawings, in which:

FIGURE 1 is a somewhat schematic block diagram illustrating the principles of operation of a sampling and analyzing instrument constructed in accordance with the instant invention; and FIGURE 2 is a schematic circuit diagram of the instrument illustrated in FIGURE 1.

Turning to FIGURE 1, there is illustrated a sampling and analyzing instrument 10 constructed in accordance with the teachings of the instant invention. As will be further appreciated, the instrument 10 is particularly constructed and adapted for providing a continuous and direct indication representative of the concentration of impurities, such as $SO_2$, in the air. However, it is to be understood that the invention has much broader application in that it might be utilized to provide a direct indication of any parameter or variable which can be initially represented by a variable impedance.

The instrument includes a power supply 12 for providing positive and negative lines to an oscillator 14 (see FIGURE 2). The power supply might include a conventional step-down transformer and suitable rectifier means if it is desired to operate the instrument off conventional AC power sources or, alternatively, could constitute a self-contained power supply such as a DC battery if it is desired that the instrument 10 constitute a completely independent and self-contained portable unit. The oscillator 14 may be any conventional oscillator which produces an output wave of relatively stable amplitude though not necessarily of stable frequency. Since the power supply 12 and oscillator 14 individually form no part of the instant invention, further description is throught unnecessary. For the purpose of understanding the instant invention, it is sufficient to note that the output of the oscillator 14 represents the input voltage $V_{in}$ of an operational amplifier, generally designated 16, the output voltage of which is customarily designated $V_o$.

The operational amplifier 16 is a conventional device, such as an analog amplifier, and includes a feedback loop 18, which includes a feedback impedance 20, commonly designated $R_f$, and an input impedance 22, commonly designated $R_{in}$. In accordance with well known principles, the operation of the amplifier 16 is defined by the following equation:

$$\frac{V_0}{V_{in}} \approx \frac{R_f}{R_{in}}$$

In accordance with the instant invention, one of the impedances of the operational amplifier 16 (in the illustrated embodiment of FIGURE 1, the input impedance 22 is chosen) is replaced by a sensing element or probe 24, the impedance of which varies in accordance with the concentration of the pollutant or impurity which is exposed thereto. Thus in a preferred embodiment, the sensing probe 24 comprises a pair of electrodes 26 and 28 immersed in a conductive fluid 30, such as acidified hydrogen peroxide, the impedance of which varies in accordance with concentration of the air pollutant, such as $SO_2$, which is brought into contact with the upper surface of the fluid 30 as indicated by the arrow 32 depicting air containing $SO_2$.

Rearranging the above noted equation to solve for $V_o$ one obtains:

$$V_0 \approx V_{in} \times \frac{R_f}{R_{in}}$$

such that by means of the operational amplifier 16, a variable output voltage appearing at 34, in FIGURE 1, will be produced which is proportional (in this instance inversely proportional) to the concentration of the impurity being detected. By means of a suitable rectifier 36 and DC meter 38, calibrated directly in units of concentration per liter of air, it is thereby possible to obtain a direct and continuously monitored indication of pollution.

Although in the illustrated embodiment the variable impedance sensing probe 24 has been used as the input impedance $R_{in}$ (22) of the operational amplifier 16, it is to be appreciated that, if desired, the variable impedance probe 24 could just as easily be substituted for the feedback impedance $R_f$ (20), in which case the output voltage at 34, $V_o$, would be directly proportional rather than inversely proportional to the variations in the impedance of the probe 24, and hence directly proportional to the concentration of the impurity in the air.

In its preferred embodiment, the instant invention also includes temperature compensation means for varying the output of the operational amplifier in accordance with variations in ambient temperature conditions. Thus, since the impedance of the sensing element 24 is likely to be influenced by ambient temperature variations, a thermistor 42, i.e., a resistance which varies with temperature, is provided to automatically compensate the operational amplifier for ambient temperature variations. In the schematic illustration of FIGURE 1, the thermistor 42 is schematically shown electrically connected in parallel to the feedback impedance 20. However, it will be appreciated that various other electrical connections and arrangements are possible and within the knowledge of those skilled in the art so long as the end result is to compensate for ambient temperature variations.

As will be described in further detail, the instrument includes a range selector 44, the purpose of which is to selectively vary the magnitude of the input signal to the operational amplifier 16. With reference to the aforementioned equation, wherein the output voltage of the amplifier 16 is proportional to the magnitude of the input voltage, an increased input voltage will generate a correspondingly larger output voltage $V_o$. Therefore, even when the concentration of the impurity varies over a great range (such that the ratio $R_f/R_{in}$ may become very large or very small) by simply varying the input voltage $V_{in}$, it is still possible to use the instrument of the instant invention.

In conjunction with the operation of the range selector 44, it will be appreciated that means must be simultaneously provided for shifting the zero point from which the output signal $V_o$ is measured. Thus in FIGURE 1, where the meter 38 is responsive to the output voltage of the operational amplifier, if one uses the range selector to increase the magnitude of the voltage $V_{in}$, he must also upshift the zero point of the meter 38 which is established by the line 46, in a manner to be further described. If the zero point of the meter is not raised with an increase of the input voltage $V_{in}$, an incorrect indication of concentration will result. To this end the instant invention includes a zero shifter 48, to be further described, to vary the zero level of the meter in response to variations in the input signal $V_{in}$ brought about by operation of the range selector 44.

Turning to FIGURE 2, there is shown a schematic circuit diagram of the invention illustrated in FIGURE 1, wherein like numbers have been used to indicate like elements. As noted previously, the power supply 12 establishes a positive and negative bus 50 and 52, respectively, which, in addition to supplying the oscillator 14 also establish bias voltages for a transistor 54 and 56, respectively. The base of transistor 54 is responsive to the output of the operational amplifier 16 such that the output voltage $V_0$ will be fed to the diode 36 to the positive input terminal 58 of the meter 38.

The range selector 44 preferably comprises a variable potentiometer arrangement 60 by which a desired portion of the output of the oscillator 14 can be fed into the operational amplifier 16 by virtue of the wiper arm 62. Simultaneously, by virtue of the conductor 64 a similar portion of the output of the oscillator 14 is fed to the base of the second transistor 56 which functions as the zero shifter, which, by virtue of the diode 66, varies the zero point of the meter 38 by virtue of increasing or decreasing the potential on the negative terminal 68 thereof. Thus whenever there is a change in range or sensitivity by virtue of operation of the range selector 44, there will be an automatic compensation for the zero point of the meter whereby the accuracy of the final concentration reading is maintained.

Thus there has been described a sampling and analyzing instrument which is simple, relatively inexpensive and easy to utilize. By drawing upon the excellent characteristics of an operational amplifier, the prior technique of continuously balancing a resistor bridge is eliminated. In addition, with the use of a novel range selection and automatic zero shifter responsive thereto, the single instrument of the instant invention has greater sensitivity possibilities and can be utilized to provide an indication of a much greater range of concentrations of the impurity being detected.

The embodiments of the invention in which an exclusive privilege or property is claimed are defined as follows:

1. Apparatus for detecting the presence of a substance, said apparatus comprising:
   sensing means responsive to the presence of said substance for producing a variable impedance proportional to the concentration of said substance; and
   amplifier means responsive to said variable impedance means for producing a variable output signal proportional to said variable impedance;
   and further including oscillation means for producing an input signal for said amplifier means; and
   wherein said amplifier means is an operational amplifier including feedback impedance means and input impedance means, one of which is said variable impedance means, and wherein said operational amplifier operates according to the equation $$\frac{V_0}{V_{in}} = \frac{R_f}{R_{in}}$$

wherein $V_0$ = said output signal
$V_{in}$ = said input signal
$R_f$ = said feedback impedance
$R_{in}$ = said variable impedance; and further including range selection means responsive to said oscillation means for selectively varying the amplitude of said input signal to said amplifier means whereby with a given $R_f$ and $R_{in}$, the magnitude of said output signal can be varied.

2. The apparatus of claim 1, and further including meter means responsive to said output signal of said amplifier means for producing an indication of the concentration of said substance; and further including circuit means responsive to said oscillation means for producing a zero point signal for said meter means, said meter means including a first input terminal which receives said variable output signal and a second input terminal which receives said zero point signal to define the zero point for said meter means.

3. The apparatus of claim 2, and further including shifting means responsive to operation of said range selection means for varying the magnitude of said second input signal in response to variations in said input signal, whereby a given value of said variable impedance means will provide a correct indication of the concentration of said substance regardless of the use of said range selection means.

4. The apparatus of claim 3, and further including power supply means for providing a positive and negative signal to said oscillation means.

5. The apparatus of claim 1, wherein said range selection means comprises a variable potentiometer interposed between said oscillation means and said amplifier means.

6. The apparatus of claim 4, wherein said shifting means includes transistor means, the emitter and collector of which are responsive to said positive and negative signals, and the base of which is responsive to said range selection means, wherein said second input signal to said meter means will be varied in accordance with operation of said range selection means.

References Cited

UNITED STATES PATENTS 3,131,346  4/1964  Parke _____ 324—30
3,379,973  3/1968  Walton _____ 324—62

EDWARD E. KUBASIEWICZ, Primary Examiner

U.S. Cl. X.R.

307—229; 324—30, 65

UNITED STATES PATENT OFFICE
CERTIFICATE OF CORRECTION

Patent No. 3,493,857          Dated February 3, 1970

Inventor(s) John Silverman

It is certified that error appears in the above-identified patent and that said Letters Patent are hereby corrected as shown below:

Claim 3, column 6, line 27, delete "second input" and substitute --zero point--.
Claim 6, column 6, line 44, delete "second input" and substitute --zero point--.

SIGNED AND SEALED
NOV 3 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,493,857          Dated February 3, 1970

Inventor(s) John Silverman

It is certified that error appears in the above-identified patent and that said Letters Patent are hereby corrected as shown below:

Claim 1, column 5, line 49, delete "variable impedance" and substitute --sensing --.

Claim 1, column 6, line 2, delete "=" and substitute --$\approx$--.

Signed and sealed this 29th day of February 1972.

(SEAL)
Attest:

EDWARD M. FLETCHER, JR.
Attesting Officer

ROBERT GOTTSCHALK
Commissioner of Patents